(12) United States Patent
Hase

(10) Patent No.: US 8,633,264 B2
(45) Date of Patent: Jan. 21, 2014

(54) POLYACETAL RESIN COMPOSITION

(75) Inventor: Hiroyuki Hase, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 165 days.

(21) Appl. No.: 12/810,235

(22) PCT Filed: Nov. 5, 2008

(86) PCT No.: PCT/JP2008/003184
§ 371 (c)(1),
(2), (4) Date: Jun. 23, 2010

(87) PCT Pub. No.: WO2009/081517
PCT Pub. Date: Jul. 2, 2009

(65) Prior Publication Data
US 2010/0280156 A1    Nov. 4, 2010

(30) Foreign Application Priority Data

Dec. 26, 2007 (JP) ................. 2007-333942

(51) Int. Cl.
*C08K 5/00*  (2006.01)
*C08K 5/34*  (2006.01)

(52) U.S. Cl.
USPC ............................................. 524/91; 524/99

(58) Field of Classification Search
USPC .......................................................... 524/91
See application file for complete search history.

(56) References Cited

U.S. PATENT DOCUMENTS 4,607,075 A    8/1986    Baum et al.

FOREIGN PATENT DOCUMENTS

| EP | 1 522 554 A1 | 4/2005 |
|---|---|---|
| EP | 1522554 A1 * | 4/2005 |
| JP | 61-036339 | 2/1986 |
| JP | 62-190249 | 8/1987 |
| JP | 02-140243 | 5/1990 |
| JP | 06-256623 | 9/1994 |
| JP | 08-120115 | 5/1996 |
| JP | 09-076272 | 3/1997 |
| JP | 10-182928 | 7/1998 |
| JP | 11-021376 | 1/1999 |
| JP | 11-335518 | 12/1999 |
| JP | 2000-026704 | 1/2000 |
| JP | 2003-113289 | 4/2003 |
| JP | 2005-112995 | 4/2005 |
| JP | 2007-084714 | 4/2007 |
| JP | 2008-007676 | 1/2008 |

OTHER PUBLICATIONS

International Search Report for PCT/JP2008/003184, mailed Feb. 10, 2009.

* cited by examiner

*Primary Examiner* — Hui Chin
(74) *Attorney, Agent, or Firm* — Nixon & Vanderhye P.C.

(57) ABSTRACT

The present invention provides a polyacetal resin composition having a metallic appearance, suppressing the generation of volatile organic compound (VOC), in particular formaldehyde from the molded article thereof to an extremely low level and giving excellent weathering (light) resistance. Specifically, (A) 100 parts by weight of a polyacetal copolymer containing 1.0 mmol/kg or smaller of a hemiformal terminal group, 2.0 mmol/kg or smaller of a formyl terminal group, 0.5 wt % or smaller of an unstable terminal group, (B) 0.03 to 0.30 part by weight of a hindered phenol-based antioxidant, (C) 0.01 to 1 part by weight of a guanamine compound, (D) 0.2 to 1 part by weight of a hindered amine-based stabilizer, and (E) 0.1 to 1 part by weight of an ultraviolet absorber, and (F) 1 to 20 parts by weight of a metallic pigment are blended together.

14 Claims, No Drawings

US 8,633,264 B2

POLYACETAL RESIN COMPOSITION

This application is the U.S. national phase of International Application No. PCT/JP2008/003184, filed 5 Nov. 2008, which designated the U.S. and claims priority to Japanese Application No. 2007-333942, filed 26 Dec. 2007, the entire contents of each of which are hereby incorporated by reference.

TECHNICAL FIELD

The present invention relates to a polyacetal resin composition having a metallic appearance, significantly suppressing the generation of volatile, organic compound (VOC) and giving excellent weathering (light) resistance. This resin composition can preferably be used for interior decorative materials of automobiles, and the like.

BACKGROUND ART

Polyacetal resins have various excellent properties and molded articles thereof are utilized in wide-ranging fields, but in association with the dramatic development of technology in the field of application, there is a tendency to demand more excellent properties for polyacetal resin materials to be used. In the field of application for automobile interior decorative parts and the like, there has been such a demand for polyacetal resin materials which have excellent heat stability, the reduced generation amount of volatile organic compound from that resin, an excellent weathering resistance and further a metallic appearance for imparting a luxurious taste.

To cope with those matters above, a variety of improving methods have been known to each individual property demanded.

For example, to improve heat stability polyacetal resin, hindered phenol-based compounds as an antioxidant, nitrogen-containing compounds such as melamine and polyamides as a heat-resistant stabilizer, and other compounds such as oxides, hydroxides, inorganic acid salts and carboxylates of alkaline-earth metals have generally been blended.

Further, to reduce the generation amount of formaldehyde as a volatile organic compound, there are disclosed polyacetal resin compositions containing varieties of compounds. For example, there are disclosed: a polyacetal resin composition containing a polyacetal resin and a glyoxy-diureido compound (JP-A 10-182928 (Claim 1)); a polyacetal resin composition containing a polyacetal resin, and a cyclic nitrogen-containing compound (glycocyamidine such as creatinine, or a derivative thereof) (JP-A 11-335518 (Claim 1)); a polyacetal resin composition containing a polyacetal resin, at least one processing stabilizer selected from polyalkylene glycol, fatty acid ester, fatty acid amide, and fatty acid metal salt, and at least one suppressor selected from urea, a derivative thereof, and an amidine derivative (JP-A12-26704 (Claim 1)); a polyacetal resin composition containing a polyacetal resin, a hindered phenol-based compound, a spiro compound having triazine ring, and at least one of processing stabilizer and a heat-resistant stabilizer (JP-A 2003-113289 (Claim 1)); and a polyacetal resin composition containing a polyacetal resin, and a guanamine derivative such as benzoguanamine a stabilizer (JP-A 62-190248 A). In addition, JP-A 2005-112995 discloses a polyacetal resin composition composed of a polyacetal copolymer having a specific terminal group, and a formaldehyde inhibitor, with the disclosure of a guanamine compound, a urea-based compound, and a carboxylic acid hydrazide-based compound as the formaldehyde inhibitor.

In addition, in order to improve the weathering resistance of polyacetal resin, JP-A 61-36339 discloses a composition obtained by adding a benzotriazole-based material or the like and a hindered amine-based material to polyacetal resin to coexist. Further, JP-A 6-256623 discloses a composition for which weathering (light) resistance and thermal stability have been improved by blending an antioxidant, tetrakis[methylene-3-(3',5'-di-t-butyl-4'-hydroxyphenyl)-propionate]methane, a light stabilizer, bis-[N-methyl-2,2,6,6-tetramethyl-4-piperidinyl sebacate, and a UV absorber, 2-[2'-hydroxy-3',5'-bis-(α,α-dimethylbenzyl)phenyl]benzotriazole.

According to the techniques disclosed in these documents, it is possible to significantly reduce the generation of formaldehyde from polyacetal resin, and furthermore, it is possible to impart excellent weathering resistance to polyacetal resin.

Only a simple combination of these techniques can not bring, however, the additive property of effects into existence. In particular, when a hindered phenol and a hindered amine are used in combination, an opposing effect lowers thermal stability and light stability, thereby making it very difficult to obtain a resin substance having excellent weathering resistance, significantly suppressing the generation of formaldehyde, and having no such problem as defective appearance due to the bleeding of blending components.

Further, as a method for imparting a metallic appearance to polyacetal resin, only applying coating or metal plating onto a molded article is known and polyacetal resin material for imparting a metallic appearance without the need of these secondary processing has not been known.

DISCLOSURE OF THE INVENTION

The purpose of the present invention is to provide a polyacetal resin composition having a metallic appearance, suppressing the generation of volatile organic compound (VOC), in particular, formaldehyde from the molded article thereof to an extremely low level and giving excellent weathering (light) resistance.

The present inventors have worked hard in order to solve the above-described problems and, as the result, have found that the purpose can be achieved by controlling the combination of specific blending components to thereby complete the present invention.

That is, the present invention relates to a polyacetal resin composition, containing:

(A) 100 parts by weight of a polyacetal copolymer having 1.0 mmol/kg or smaller of a hemiformal terminal group, 2.0 mmol/kg or smaller of a formyl terminal group, and 0.5% by weight or smaller of an unstable terminal group;

(B) 0.03 to 0.30 parts by weight of a hindered phenol-based antioxidant;

(C) 0.01 to 1 parts by weight of a guanamine compound;

(D) 0.2 to 1 part by weight of a hindered amine stabilizer;

(E) 0.1 to 1 part by weight of a UV absorber; and (F) 1 to 20 part by weight of a metallic pigment.

In the present invention, since the polyacetal resin and blending components to be used are selectively combined, it is possible to suppress the generation of formaldehyde from the molded articles to an extremely low level even after blending a metallic pigment and to provide excellent weathering (light) resistance.

The polyacetal resin composition of the present invention is constituted by containing the (A) polyacetal copolymer having specified terminal properties, the (B) hindered phenol-based antioxidant, the (C) guanamine compound, the (D) hindered amine stabilizer, the (E) UV absorber, and the (F) metallic pigment.

The present invention will be described in detail in the following.

(A) Polyacetal Copolymer

The present invention makes use of a (A) polyacetal copolymer having specific terminal characteristics as the base resin. A polyacetal copolymer is a resin having oxymethylene group ($-OCH_2-$) as a main component unit, and other comonomer units except the oxymethylene unit and is generally manufactured by copolymerization of formaldehyde or a cyclic oligomer of formaldehyde, as a main monomer, with a compound selected from a cyclic ether and a cyclic formal, as a comonomer. The obtained copolymer is normally stabilized against thermal decomposition by removing unstable terminal parts through hydrolysis. Specifically, the main monomer commonly used is trioxane which is a cyclic trimer of formaldehyde. Trioxane is normally obtained by the reaction of aqueous solution of formaldehyde in the presence of an acidic catalyst, and is used by purifying through a method such as distillation. As described later, the trioxane used for the polymerization is preferably the one containing small amounts of impurities such as water, methanol, and formic acid as far as possible. Examples of the cyclic ether and cyclic formal as the comonomer are ethylene oxide, propylene oxide, butylene oxide, cyclohexene oxide, oxetane, tetrahydrofuran, trioxepane, 1,3-dioxan, 1,3-dioxolane, propylene glycol formal, diethylene glycol formal, triethylene glycol formal, 1,4-butandiol formal, 1,6-hexanediol formal, and the like. Furthermore, a compound which can form branched structure or crosslinked structure can be used as the comonomer (or termonomer), and that type of compound includes: alkyl or aryl glycidyl ethers such as methyl glycidyl ether, ethyl glycidyl ether, butyl glycidyl ether, 2-ethylhexyl glycidyl ether, and phenyl glycidyl ether; and diglycidyl ethers of alkylene glycol or polyalkylene glycol, such as ethylene glycol diglycidyl ether, triethylene glycol diglycidyl ether, and butandiol diglycidyl ether. These comonomers can be used alone or in combination of two or more of them.

The above polyacetal copolymer can be obtained normally by cationic polymerization through the addition of an adequate amount of molecular-weight adjustor and through the use of a cationic polymerization catalyst. Applicable molecular-weight adjustor, cationic polymerization catalyst, polymerization method, polymerization apparatus, deactivation of catalysts after polymerization, method for stabilizing terminals of crude polyacetal copolymer prepared by the polymerization, and the like are known in many literatures, and any of them can be used basically.

Although the molecular weight of the polyacetal copolymer used in the present invention is not specifically limited, the weight-average molecular weight is preferably within the range of about 10,000 to 400,000. The polyacetal copolymer preferably has the Melt Index (determined at 190° C. under 2.16 kg of load, in accordance with ASTM-D1238), which is an index of flowability of the resin, within the range of 0.1 to 100 g/10 min, and more preferably 0.5 to 80 g/10 min.

The (A) polyacetal copolymer used in the present invention is required to have specific terminal characteristics as described above, and in concrete terms, it is essential to have the amount of hemiformal terminal group of 1.0 mmol/kg or less, the amount of formyl terminal group of 2.0 mmol/kg or less, and the amount of unstable terminal group of 0.5% by weight or less.

Here, the hemiformal terminal group is represented by $-OCH_2OH$, and is also referred to as hydroxymethoxy group or hemiacetal terminal group. Further, the formyl group is represented by $-CHO$. The amount of such hemiformal terminal group and formyl group can be determined by $^1H$-NMR, and the detail determination method can be referred to in the method described in JP-A2001-11143. The amount of unstable terminal group means the amount of a part, existing in the terminal portion of the polyacetal copolymer and being readily decomposed because of the instability against heat and base. The amount of such unstable terminal group is determined as follows: One gram of polyacetal copolymer is placed in a pressure-resistant closed container together with 100 ml aqueous solution of 50% (by volume) methanol containing 0.5% by volume of ammonium hydroxide. The mixture is heated to 180° C. for 45 minutes, and then is cooled. After that, the container is opened, and the amount of formaldehyde decomposed and eluted in the solution is quantified thereby to express the amount as weight percent to the amount of polyacetal copolymer, which is the amount of the unstable terminal group.

If the (A) polyacetal copolymer to be used does not have the above terminal characteristics, but has the characteristics of more than the upper limit, the polyacetal resin composition having sufficiently reduced generation of formaldehyde cannot be obtained, and further it becomes difficult to keep the amount of formaldehyde generated by the repeated heat-history at a low level. In this regard, the polyacetal copolymer (A) used in the present invention preferably has the amount of hemiformal terminal group of 0.8 mmol/kg or less and more preferably 0.6 mmol/kg or less, the amount of formyl terminal group of 1.5 mmol/kg or less and more preferably 1.0 mmol/kg or less, and the amount of unstable terminal group of 0.4% by weight or less and more preferably 0.3% by weight or less. The lower limits of the amount of hemiformal terminal group, the amount of formyl terminal group, and the amount of unstable terminal group are not specifically limited.

The (A) polyacetal copolymer having the above-described specific terminal characteristics can be produced by reducing impurities in the monomer and the comonomer, selecting the production process, and optimizing the production conditions, and the like.

Examples of the method for producing the (A) polyacetal copolymer having the specific terminal characteristics satisfying the requirements of the present invention will be given below, but are not limited to these methods.

First, it is important to minimize active impurities which form unstable terminals in polymerization systems, specifically the impurities such as water, alcohol (such as methanol), and acid (such as formic acid) in the monomer and the comonomer. The total amount of these active impurities is preferably regulated to $1 \times 10^{-2}$% by mole or less, and more preferably $5 \times 10^{-3}$% by mole or less, to the amount of total monomers in the reaction systems. Excessive amount thereof is naturally not preferable to obtain the polyacetal polymer having a small amount of unstable terminal parts. In addition, the molecular weight of the polyacetal polymer can be adjusted by adding an arbitrary amount of a chain-transfer agent which does not form unstable terminals, such as linear, low-molecular-weight acetal having alkoxy groups at both terminals, such as methylal.

Next, an amount of a catalyst for use in polymerization reaction is also an important requirement. When boron trifluoride or a coordinate compound thereof is used as a catalyst, the addition amount of the catalyst is preferably within the range of $5 \times 10^{-3}$ to $1 \times 10^{-2}$% by mole to the total amount of monomer, and is specifically preferable within the range of $1 \times 10^{-3}$ to $7 \times 10^{-3}$% by mole. Limiting the amount of catalyst to the above range is effective in preventing the formation of unstable terminal parts. Excessive amounts of catalyst make the adequate control of polymerization temperature difficult, and the decomposition reaction during the polymerization becomes predominant, which makes it difficult to obtain the polyacetal polymer having a small amount of unstable terminal parts satisfying the requirements of the present invention. On the other hand, an excessively small amount of catalyst is not preferable because the polymerization reaction rate decreases and the polymerization yield decreases.

The amount and the type of comonomer significantly affect the thermal stability of the polyacetal polymer. The (A) polyacetal polymer of the present invention is preferably the one prepared by the copolymerization of trioxane (a-1) with one or more of compound (a-2) selected from cyclic ether and cyclic formal, at a ratio of the former (a-1) to the latter (a-2) from 99.9/0.1 to 80.0/20.0 (by weight), and more preferably from 99.5/0.5 to 90.0/10.0 (by weight). The compound (a-2) selected from cyclic ether and cyclic formal is particularly preferably ethylene oxide, 1,3-dioxolan, 1,4-butandiol formal, and diethylene glycol formal.

Any of the conventionally known polymerization methods are possible. From industrial point of view, however, a preferred one is the continuous bulk polymerization method in which solid powdered and massive polymer is obtained with the progress of polymerization using a liquid monomer, and the polymerization temperature is preferably kept within the range of 60° C. to 105° C., specifically 65° C. to 100° C.

When a catalyst made up of boron trifluoride or a coordinate compound thereof is used, the method for adding the polymer after polymerization to an aqueous solution containing a basic compound, or the like is possible as a deactivation method of the catalyst after polymerization. In order to obtain the polyacetal polymer satisfying the requirements of the present invention, however, it is preferred to pulverize the polymer obtained by the polymerization reactions into pieces, which are then brought into contact with a deactivator, thus the catalyst being promptly deactivated. For example, it is desirable that the polymer for deactivating the catalyst be pulverized into pieces composed of 1.5 mm or smaller size for 80% by weight or more, preferably 90% by weight or more, and composed of 0.3 mm or smaller size for 15% by weight or more, preferably 20% by weight or more. As a basic compound for neutralizing and deactivating the polymerization catalyst, there can be used: ammonia; or amines such as triethyl amine, tributyl amine, triethanol amine or tributanol amine; or oxide, hydroxide, and salt of alkali metal and alkali earth metal; and other known catalyst deactivators. The basic compound is preferably added as an aqueous solution at concentrations within the range of 0.001 to 0.5% by weight, specifically 0.02 to 0.3% by weight. Additionally, a preferable temperature of the aqueous solution is within the range of 10° C. to 80° C., and more preferably 15° C. to 60° C. After the completion of the polymerization, it is also preferable to add promptly the polymer to these aqueous solutions to thereby deactivate the catalyst.

Furthermore, before the polymerization, by adding a hindered phenol-based antioxidant to the monomer within the range of 0.01 to 0.0% by weight to the total amount of monomer, and conducting the polymerization in the presence of the antioxidant uniformly in the polymerization reaction systems, the depolymerization during the polymerization can be suppressed, and thus the oxidation decomposition during the post-treatment process such as drying and the stabilization process after the polymerization, can also be suppressed.

As described above, through the reduction in the amount of impurities in the monomer and the comonomer, the selection of manufacturing process and the optimization of manufacturing conditions, or the like, the polyacetal polymer having a small amount of unstable terminals can be manufactured. If further required, the adoption of stabilization process can further reduce the amount of unstable terminals. Applicable stabilization process includes the one in which the polyacetal polymer is heated at the melting point or higher, and the polyacetal polymer in the molten state is treated thereby to decompose and remove solely the unstable parts, or the one in which the polyacetal polymer is subjected to heat treatment at 80° C. or higher while maintaining the heterogeneous system in an insoluble liquid medium, thereby to decompose and remove solely the unstable terminal parts.

(B) Hindered Phenol-Based Antioxidant

The hindered phenol-based antioxidant (B) used in the present invention includes a monocyclic hindered phenol compound, a polycyclic hindered phenol compound bonded by a hydrocarbon group or a group containing sulfur atom, and a hindered phenol compound having ester group or amide group. The above compounds can be exemplified as follows: 2,6-di-t-butyl-p-cresol, 2,2'-methylenebis(4-methyl-6-t-butylphenol), 4,4'-methylenebis(2,6-di-t-butylphenol), 1,1,3-tris(2-methyl-4-hydroxy-5-t-butylphenyl)butane, 4,4'-butylidenebis(3-methyl-6-t-butylphenol), 1,3-5-trimethyl-2-4,6-tris(3,5-di-t-butyl-4-hydroxybenzyl)$_b$ enzene, 4,4'-thiobis(3-methyl-6-t-butylphenol), n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol-bis[3-(3,5-di-t-butyl-4-hydroxphenyl)propionate], ethylenebis(oxyethylene)bis-[3-(5-tert-butyl-4-hydroxy-m-tryl) propionate], pentaerythritol tetrakis[3-(3,5-di-t-butyl-4-hydroxyphenyl)propionate], 3,9-bis[2-{3-(3-t-butyl-4-hydroxy-5-methylphenyl)-propionyloxy}-1,1-dimethylethyl]-2,4,8,10-tetraoxaspiro-[5,5]undecane, 2-t-butyl-6-(3'-t-butyl-5'-methyl-2'-hydroxybenzyl)-4-methylphenylacrylate, 2-[1-(2-hydroxy-3,5-di-t-pentylphenyl)ethyl]-4,6-di-t-pentylphenylacrylate, di-n-octadecyl-3,5-di-t-butyl-4-hydroxybenzylphosphonate, N,N'-hexamethylenebis-(3,5-di-t-butyl-4-hydroxy-dihydrocinnamamide, N,N'-ethylenebis[3-(3,5-di-t-butyl-4-hydroxyphenyl)-propionamide], N,N'-tetramethylenebis[3-(3,5-di-t-butyl-4-hydroxyphenyl)-propionamide], N,N'-hexamethylenebis[3-(3,5-di-t-butyl-4-hydroxyphenyl)-propionamide], N,N'-ethylenebis[3-(3-t-butyl-5-methyl-4-hydroxyphenyl)-propionamide], N,N'-hexamethylenebis-[3-(3-t-butyl-5-methyl-4-hydroxyphenyl)propionamide], N,N'-bis[3-(3,5-di-t-butyl-4-hydroxyphenyl)propyonyl] hydrazine, N,N'-bis[3-(3-t-butyl-5-methyl-4-hydroxphenyl) propyonyl]-hydrazine, 1,3,5-tris(3,5-di-t-butyl-4-hydroxybenzyl)isocyanurate, 1,3,5-tris(4-t-butyl-3-hydroxy-2,6-dimethylbenzyl)-isocyanurate, and the like.

These (B) hindered phenol-based antioxidants can be used alone or in combination of two or more of them. The addition amount of the (B) hindered phenol-based antioxidant is within the range of 0.03 to 0.30 parts by weight to 100 parts by weight of the (A) polyacetal copolymer. If the amount is less than that range, the effect becomes insufficient. If the amount is more than that range, the weathering (light) resistance becomes deteriorated due to the antagonistic action to the hindered amine stabilizer.

(C) Guanamine Compound

Guanamine compound to be used in the present invention can include melamine, aliphatic guanamine-based compound, alicyclic guanamine-based compound, aromatic guanamine-based compound, and hetero-atom-containing guanamine-based compound.

Examples of the aliphatic guanamine-based compound are: monoguanamines such as valeroguanamine, caproguanamine, heptanoguanamine, capryloguanamine or stearoguanamine; and alkylene bisguanamines such as succinoguanamine, glutaroguanamine, adipoguanamine, pimeloguanamine, suberoguanamine, azeloguanamine or sebacoguanamine.

Examples of the alicyclic guanamine-based compound are: monoguanamines such as cyclohexane carboguanamine, norbornene carboguanamine, cyclohexene carboguanamine or norbornane carboguanamine; and derivatives thereof in which the cycloalkane residue is substituted with 1 to 3 of functional groups such as alkyl group, hydroxy group, amino group, acetoamino group, nitrile group, carboxy group, alkoxycarbonyl group, carbamoyl group, alkoxy group, phenyl group, cumyl group or hydroxyphenyl group.

Examples of the aromatic guanamine-based compound are: benzoguanamine and derivatives thereof in which the phenyl residue is substituted with 1 to 5 of functional groups such as alkyl group, hydroxy group, amino group, acetoamino group, nitrile group, carboxy group, alkoxy carbonyl group, carbamoyl group, alkoxy group, phenyl group, cumyl group or hydroxyphenyl group, (for example, toluguanamine, xyloguanamine, phenylbenzoguanamine, hydroxybenzoguanamine, 4,(4'-hydroxyphenyl)benzoguanamine, nitrilebenzoguanamine, 3,5-dimethyl-4-hydroxybenzoguanamine, and 3,5-di-t-butyl-4-hydroxybenzoguanamine etc.); monoguanamine such as naphthoguanamine and derivatives thereof in which the naphthyl residue is substituted with the above functional group; polyguanamines such as phthaloguanamine, isophthaloguanamine, terephthaloguanamine, naphthalene diguanamine or biphenylene diguanamine; and aralkyl or aralkylene guanamines such as phenylacetoguanamine, β-phenylpropioguanamine or xylylene bisguanamine.

Examples of the heteroatom-containing guanamine-based compound include: acetal group-containing guanamines such as 2,4-diamino-6-(3,3-dimethoxypropyl)-s-triazine; dioxane ring-containing guanamines such as [2-(4'-6'-diamino-s-triazin-2'-yl)ethyl]-1,3-dioxane or [2-(4'-6'-diamino-s-triazine-2'-yl)ethyl]-4-ethyl-4-hydroxy methyl-1,3-dioxane; tetraoxospiro ring-containing guanamines such as CTU-guanamine or CMTU-guanamine; isocyanule ring-containing guanamines such as 1,3,5-tris[2-(4',6'-diamino-s-triazine-2'-yl)ethyl]isocyanurate or 1,3,5-tris[3-(4',6'-diamino-s-triazine-2'-yl)propyl]isocyanurate; imidazoyl ring-containing guanamines such as the guanamine compounds disclosed in JP-A 6-179671 A and JP-A 7-10871; imidazole ring-containing guanamines such as the guanamine compounds disclosed in JP-A 47-41120, JP-A 03-284675, and JP-A 7-33766; and guanamine compounds disclosed in JP-A 2000-154181.

Furthermore, there are also included a compound in which a hydrogen of an amino group in the guanamine-based compound described above is substituted by an alkoxymethyl group, such as (mono to tetra)methoxymethylbenzoguanamine, and (mono to octa)methoxymethyl-CTU-guanamine.

Among these guanamine-based compounds, preferred ones include melamine, benzoguanamine, and CTU-guanamine, and specifically preferred ones include benzoguanamine and CTU-guanamine.

In the present invention, the addition amount of a compound selected from guanamine-based compounds as described above is within the range of 0.01 to 1 part by weight to 100 parts by weight of the (A) polyacetal copolymer, and preferably 0.03 to 0.7 part by weight. When the addition amount of the compound (C) is excessively small, the polyacetal resin composition having fully reduced generation of formaldehyde cannot be obtained, and further it becomes difficult to maintain the amount of formaldehyde generated by the repetition of heat history at a low level. On the other hand, when the addition amount of the compound (C) is excessively large, problems such as deterioration in mechanical properties and poor appearance caused by bleeding occur.

(D) Hindered Amine-Based Stabilizer

The hindered amine-based stabilizers used in the present invention include piperidine derivatives having a sterically hindered group, such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl) hexamethylene-1,6-dicarbamate, bis(1-methyl-2,2,6,6-tetramethyl-4-piperidyl)adipate, or tris(2,2,6,6-tetramethyl-4-piperidyl)benzene-1,3,5-tricarboxylate. Furthermore, a high-molecular-weight piperidine derivative polycondensate such as a polycondensate of dimethylsuccinate-1-(2-hydroxyethyl)-4-hydroxy-2,2,6,6-tetramethylpiperidine is also effective.

Among them, the hindered amine stabilizer in which the nitrogen that forms the cyclic amine of a piperidine derivative having a sterically hindered group is ternary is preferable. Examples of such hindered amine stabilizers include aliphatic di- or tri-carboxylic acid-bis- or tris-piperidyl ester such as bis(1,2,2,6,6-pentamethyl-4-piperidyl)adipate and bis(1-octyloxy-2,2,6,6-tetramethyl-4-piperidyl sebacate (C$_{2-20}$ aliphatic dicarboxylic acid-bispiperidyl ester and the like), N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, the polymerization product of dimethyl succinate and 4-hydroxy-2,2,6,6-tetramethyl-1-piperidine ethanol, decane diacid-bis(2,2,6,6-tetramethyl-1-(octyloxy)-4-piperidinyl)ester, bis(1,2,2,6,6-pentamethyl-4-piperidyl) [[3,5-bis(1,1-dimethylethyl)-4-hydroxyphenyl]methyl]butyl malonate, bis(1,2,2,6,6-pentamethyl-4-piperidyl)sebacate, methyl 1,2,2,6,6-pentamethyl-4-piperidyl sebacate, tetrakis (1,2,2,6,6-pentamethyl-4-piperidyl)-1,2,3,4-butane tetracarboxylate, a condensation product of 1,2,3,4-butane tetracarboxylic acid, 1,2,2,6,6,-pentamethyl-4-piperidinol and tridecylalcohol; a condensation product of 1,2,3,4-butane tetracarboxylic acid, 1,2,2,6,6,-pentamethyl-4-piperidinol and β,β,β',β'-tetramethyl-3,9-(2,4,8,10-tetraoxaspiro[5,5]-undecane)-diethanol; a reaction product of peroxidation-treated 4-butylamino-2,2,6,6,-tetramethylpiperidine, 2,4,6-trichloro-1,3,5-triazine, cyclohexane, and N,N'-ethane-1,2-diyl-bis(1,3-propanediamine); or 1-[2-{3-(3,5-di-t-butyl-4-hydroxyphenyl)propionyloxy}-ethyl]-4-{3-(3,5-di-t-butyl-4-hydroxyphenyl)propionyloxy}-2,2,6,6-tetramethylpiperidine.

As particularly preferable ones, there are mentioned tetrakis(1,2,2,6,6-pentamethyl-4-piperidyl)1,2,3,4-butane tetracarboxylate; a condensation product of 1,2,3,4-butanetetracarboxylic acid, 1,2,2,6,6,-pentamethyl-4-piperidinol and β,β, β',β'-tetramethyl-3,9-(2,4,8,10-tetraoxaspiro[5,5]-undecane)-diethanol; and a polymerization product of dimethyl succinate and 4-hydroxy-2,2,6,6-tetramethyl-1-piperidine ethanol.

In the present invention, the (D) hindered amine stabilizer in which the nitrogen that forms the cyclic amine of the piperidine derivative having a sterically hindered group is ternary is added within the range of 0.2 to 1 part by weight, preferably 0.4 to 0.8 parts by weight relative to 100 parts by weight of the (A) polyacetal copolymer.

When the blending amount of the (D) hindered amine stabilizer is too small, a polyacetal resin composition excellent in weathering resistance can not be obtained. In contrast, when the blending amount is too large, there occur such problems as the lowering of mechanical properties and poor appearance due to the bleeding.

(E) UV Absorber

The UV absorbers include benzotriazole-based compounds and anilide oxalate-based compounds. These weathering (light) stabilizers can be used either alone or in combination of two or more thereof.

Examples of benzotriazole-based compounds include benzotriazoles having a hydroxyl group- and alkyl ($C_{1-6}$ alkyl) group-substituted aryl group such as 2-(2H-benzotriazole-2-yl)-p-cresol, 2-(2H-benzotriazole-2-yl)-4-6-bis(1-methyl-1-phenylethyl)-phenol, 2-[5-chloro(2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4,6-di-tert-pentylphenol, 2-(2H-benzotriazole-2-yl)-4-(1,1,3,3-tetramethylbutyl)-phenol, and 2-(2'-hydroxy-3',5'-di-isoamylphenyl)-benzotriazole; benzotriazoles having a hydroxyl group and aralkyl (or aryl) group-substituted aryl group such as 2-[2'-hydroxy-3',5'-bis($\alpha,\alpha$-dimethylbenzyl)phenyl]-benzotriazole; and benzotriazoles having a hydroxyl group and alkoxy ($C_{1-12}$ alkoxy) group-substituted aryl group such as 2-(2'-hydroxy-4'-octoxyphenyl)benzotriazole.

These benzotriazole compounds can be used either alone or in combination of two or more thereof.

Among these benzotriazole-based compounds, 2-(2H-benzotriazole-2-yl)-4,6-bis(1-methyl-1-phenylethyl)phenol, 2-(2H-benzotriazole-2-yl)-4,6-di-tert-pentylphenol, 2-(2H-benzotriazole-2-yl)-4-(1,1,3,3-tetramethylbutyl)phenol and the like are preferable.

Examples of oxalic anilide-based compounds include N-(2-ethylphenyl)-N'-(2-ethoxy-5-t-butylphenyl)diamide oxalate, N-(2-ethylphenyl)-N'-(2-ethoxy-phenyl)diamide oxalate, and oxalic acid diamides having an aryl group, or the like which may be substituted on a nitrogen atom. These oxalic anilide compounds may be used either alone or in combination of two or more thereof.

In the present invention, the (E) UV absorber as described above is added within the range of 0.1 to 1 part by weight, preferably 0.2 to 0.8 parts by weight relative to 100 parts by weight of the (A) polyacetal copolymer. When the blending amount of the (E) UV absorber is too small, a polyacetal resin composition excellent in weathering resistance can not be obtained. In contrast, when the blending amount is too large, there occur such problems as the lowering of mechanical properties and poor appearance due to the bleeding.

(F) Metallic Pigment

The metallic pigments to be used in the present inventions include powder of metal or alloy such as aluminum, gold, silver or brass; or metal-coated powder of mica, glass or the like. Further, those obtained by dispersing them in polyethylene resin, polyethylene wax or the like may be included.

The blending amount of the (F) metallic pigment is within the range of 1 to 20 parts by weight and preferably 3 to 10 parts by weight relative to 100 parts by weight of the (A) polyacetal copolymer. When the blending amount of the (E) metallic pigment is too small, a polyacetal resin composition with good hue cannot be obtained. In contrast, when the blending amount is too large, there occur such problems as the lowering of mechanical properties and poor appearance.

(G) Compound Selected from Fatty Acid Ester and Polyalkylene Glycol

The fatty acid that is a constituent of the fatty acid ester is one kind or two more kinds of saturated or unsaturated fatty acids. Examples of these fatty acids include acetic acid, propionic acid, butyric acid, caproic acid, capric acid, undecylic acid, pivalic acid, caprylic acid, lauric acid, tridecylic acid, isotridecylic acid, myristic acid, pentadecylic acid, palmitic acid, heptadecylic acid, stearic acid, 12 hydroxystearic acid, nonadecanoic acid, arachic acid, behenic acid, lignoceric acid, cerotic acid, heptacosanic acid, montanic acid, melissic acid, laccelic acid, oleic acid, elaidic acid, linoleic acid, linolenic acid, arachidonic acid, cetoleic acid and erucic acid. Fatty acids having 12 carbon atoms or more are preferable. On the other hand, the alcohol which is the constituent of the fatty acid ester includes homopolymers of alkylene glycol (for example, $C_{2-6}$ alkylene glycols such as ethylene glycol, propylene glycol and tetramethylene glycol (and $C_{2-4}$ alkylene glycol is preferred)), copolymers, and the derivatives thereof. Specific examples include poly-$C_{2-6}$-oxyalkylene glycols such as polyethylene glycol, polypropylene glycol or polytetramethylene glycol (preferably poly-$C_{2-4}$-oxyalkylene glycol), copolymers such as polyoxyethylene-polyoxypropylene copolymer (random or block copolymer, and the like), polyoxyethylene polyoxypropylene glyceryl ether or polyoxyethylene polyoxypropylene monobutyl ether. Preferable polyoxyalkylene glycols are polymers having an oxyethylene unit such as, for example, polyethylene glycol, polyoxyethylene-polyoxypropylene copolymer, and derivatives thereof. Further, the number-average molecular weight of the above-described polyoxyalkylene glycol is within the range of $1 \times 10^3$ to $1 \times 10^6$ (for example, $1 \times 10^3$ to $5 \times 10^5$), preferably about $2 \times 10^3$ to $1 \times 10^5$ (for example, $2 \times 10^3$ to $5 \times 10^4$).

Preferable fatty acid esters include an ester of a fatty acid having 12 carbon atoms or more and a polyalkylene glycol having an average degree of polymerization ranging from about 20 to 300.

As the polyalkylene glycol, at least one selected from homopolymers and copolymers such as polyethylene glycol, polypropylene glycol, polytetramethylene glycol and polyglycerin, and the like can be used, wherein polyalkylene glycols having an average degree of polymerization ranging from about 20 to 300 are preferable.

In the present invention, blending the above-described compound selected from the (G) fatty acid ester and polyalkylene glycol is not indispensable, but when c blending these compounds, effects that promote the improvement of weathering resistance occur.

The amount of the (G) compound when blended is within the range of 0.01 to 5.0 parts by weight relative to 100 parts by weight of the (A) polyacetal copolymer, preferably 0.05 to 2.0 parts by weight.

To the polyacetal resin composition of the present invention, in order to further improve thermal stability, long-term thermal stability and the like, a metal salt of an organic carboxylic acid, a metal oxide, or metal hydroxide can further be added.

For the organic carboxylic acid for forming a metal salt of the organic carboxylic acid, various aliphatic carboxylic acids having about 1 to 34 carbon atoms are usable, including saturated aliphatic monocarboxylic acids, saturated aliphatic dicarboxylic acids, unsaturated aliphatic monocarboxylic acids, unsaturated aliphatic dicarboxylic acids, and oxyacids thereof. These aliphatic carboxylic acids may be one having a hydroxyl group. Further, these may be copolymers of a polymerizable unsaturated carboxylic acid (such as (meth) acrylic acid, maleic acid, fumaric acid, maleic anhydride and monoethyl maleate) and an olefin. Specific examples of metal salts of an organic carboxylic acid include alkali metal salts of organic carboxylic acids such as lithiumcitrate, potassium citrate, sodium citrate, lithium stearate and lithium 12-hydroxy stearate; alkali earth metal salts of organic carboxylic acids such as magnesium acetate, calcium acetate, magnesium citrate, calcium citrate, calcium stearate, magnesium stearate, magnesium 12-hydroxy stearate and calcium 12-hydroxy stearate; and ionomer resins. Among these metal salts of organic carboxylic acids, alkali earth metal salts such as calcium citrate, magnesium stearate, calcium stearate, magnesium 12-hydroxy stearate and calcium 12-hydroxy stearate, and ionomer resins are preferable.

As metal oxides and metal hydroxides, calcium oxide, magnesium oxide, zinc oxide, calcium hydroxide, magnesium hydroxide and the like are preferable.

To the polyacetal resin composition of the present invention, in addition, there may be compounded an impact resistance-improving agent, a glazing-controlling agent, a sliding-improving agent, a filler, a colorant, a nucleating agent, a mold lubricant, an antistatic agent, a surfactant, an antibacterial agent, an antifungal agent, an aromatic substance, a foaming agent, a compatibilizing agent, a physical property-improving agent (such as boric acid or derivatives thereof), a perfume and the like, which can improve various properties in accordance with respective additives without damaging the purpose of the present invention. In addition, antioxidants, heat resistant stabilizer, processability-improving agent and the like except those as described above can be used in combination.

The impact resistance-improving agent includes thermoplastic polyurethane-based resins, acrylic-based core/shell polymers, thermoplastic polyester-based elastomers, styrene-based elastomers, olefin-based elastomers, polyamide-based elastomers, rubber components (such as natural rubber) and the like.

The glazing-controlling agent includes acrylic-based core/shell polymers, thermoplastic polyurethane, thermoplastic polyester elastomer, polyamide-based elastomers, homo- and co-polymers of alkyl(meth)acrylate (such as polymethyl methacrylate), polycarbonate-based resins, styrene-based resins (such as polystyrene, AS resin or AES resin) and olefin-based resins (such as polypropylene or cyclic polyolefin).

The sliding-improving agent includes olefin-based polymers (such as polyethylene, polypropylene, copolymer of ethylene and α-olefin, and modified products thereof with acid anhydride), waxes (such as polyethylene wax), silicone oil and silicone-based resins, fluorine-containing resins (such as polytetrafluoroethylene) and fatty acid esters.

The filler includes inorganic or organic fibrous fillers such as glass fiber, carbon fiber, boron fiber, potassium titanate fiber, metal fiber or aramid fiber; plate-like fillers such as glass flake, mica or graphite; granular fillers such as milled fiber, glass bead, glass balloon, talc, kaolin, silica, diatomaceous earth, clay, wollastonite, alumina, graphite fluoride, silicon carbide, boron nitride or metal powder; and the like.

The mold lubricant includes long-chain fatty acid amides and the like. Acid amides of long-chain fatty acid (monovalent or divalent long-chain fatty acid) and amines (such as monoamines, diamines or polyamines) are usable. Examples of monoamides include primary acid amides of saturated fatty acid such as capramide, laurinamide, myristinamide, palmitinamide, stearamide, arachidamide, behenamide or montanamide; primary acid amides of unsaturated fatty acid such as oleinamide; and secondary acid amides of saturated and/or unsaturated fatty acid and monoamine such as stearylstearamide or stearyloleinamide. Bisamide includes bisamides of $C_{1-6}$ alkylene diamine (particularly, $C_{1-2}$ alkylene diamine) and the above-described fatty acid, and the like, specific examples of which include ethylenediamine-dipalmitinamide, ethylenediamine-distearamide (ethylene-bisstearylamide), hexamethylenediamine-distearamide, ethylenediamine-dibehenamide, ethylenediamine-dimontanamide, ethylenediamine-dioleinamide, ethylenediamine-dierucamide, and the like. Further, bisamides having a structure in which different acyl groups are bonded to amine sites of an alkylenediamine, such as ethylenediamine-(stearamide) oleinamide and the like are usable. Preferable fatty acid amides are bisamides.

As the colorant, various dyes, organic and inorganic pigments can be added within the range not impairing the imparting of a metallic appearance that is one of the aims of the present invention and by the coexistence with the (F) metallic pigment described above to thereby impart a unique coloring.

The production method of the polyacetal resin composition of the invention is not particularly limited. The composition can be prepared by various methods conventionally known as the preparation method of a resin composition. For example, such methods can be adopted as (1) a method in which all components constituting a composition are mixed and fed to an extruder to be molten and kneaded to obtain a pellet-like composition, (2) a method in which a part of components constituting a composition is fed from a main feed opening and the residual components are fed from a side feed opening, which are then molten and kneaded to obtain a pellet-like composition, and (3) a method in which pellets having different compositions are once prepared by extrusion or the like, and pellets obtained are mixed to be adjusted to a predetermined composition.

In the preparation of the composition using an extruder, the use of an extruder having one or more degassing vent openings is preferable. Further, it is preferable to supply water or low-molecular-weight alcohols to an arbitrary place from the main feed opening to the degassing vent opening in about 0.1 to 10 parts by weight relative to 100 parts by weight of the polyacetal resin and to degas and remove formaldehyde and the like generated in the extrusion process along with the water or low-molecular-weight alcohols from the degassing vent opening. This makes it possible to further reduce the amount of formaldehyde generated from the polyacetal resin composition and molded articles thereof.

Molded articles formed with the polyacetal resin composition of the present invention generate an extremely small amount of formaldehyde. Specifically, as the generation amount of formaldehyde according to the measurement method described in the section of Examples, 5.0 µg/g or smaller is possible per unit weight of the molded article, preferably 3.0 µg/g or smaller is possible, and further preferably 2.0 µg/g or smaller is possible. These are extremely low levels compared with the generation amount of formaldehyde, which is within the range of about 5 to 20 µg/g per unit weight, from molded articles composed of a polyacetal resin generally offered commercially. Further, molded articles composed of a recycle resin composition prepared by collecting these molded articles or the pulverized product thereof and melting and kneading the same, or molded articles formed by melting, kneading and directly molding collected molded articles or the pulverized product thereof are ones with an extremely small generation of formaldehyde in the same way as described above. The generation amount of formaldehyde is near the above-described levels.

The polyacetal resin composition of the present invention is made up of a selective combination of a specified polyacetal copolymer and blending components, and can significantly suppress the generation of formaldehyde by oxidation or thermal decomposition of the polyacetal copolymer in a molding and processing and the like, to allow work environment to be improved. In addition, the adherence of decomposed products or additives to a mold (mold deposit), and the exudation of decomposed products or additives from molded articles can significantly be suppressed and thus various problems at molding and processing can be improved. Consequently, the resin composition of the present invention is useful for molding various molded articles by usual molding methods such as, for example, injection molding, extrusion molding, compression molding, blow molding, vacuum molding, foaming molding, rotating molding and gas injection molding.

In addition, the polyacetal resin composition of the present invention is excellent also in weathering (light) resistance due to the selective combination of a specified polyacetal copolymer and blending components, and can be employed for applications that require weathering (light) resistance. Moreover, since a molded article of the polyacetal resin composition of the present invention has metallic appearance without impairing properties described above, it can provide an extremely excellent design.

The resin composition of the present invention has no limitation on the utilization field thereof for molded articles, and can favorably be used for applications that strongly require the reduction of the generation of formaldehyde, such as, for example, automotive parts, electric/electronic parts, precision machine parts, building materials, piping parts, articles for daily use, cosmetic articles' components and parts for medical devices.

EXAMPLES

Hereinafter, the present invention will be described more specifically based on Examples, but is not limited by these Examples.

In Examples and Comparative Examples, the generation amount of formaldehyde from a molded article, and weathering (light) resistance were evaluated as follows.

(Generation Amount of Formaldehyde from Molded Article)

Pellet of polyacetal resin compositions prepared in Examples and Comparative Examples was dried by a blow dryer for 3 hours at 140° C. and then molded into tabular test pieces (100 mm×40 mm×2 mm) by injection molding (at molding temperature of 190° C.). Two of the tabular test pieces (the total weight of about 22 g was weighed accurately) were hung from the lid of a bottle (volume: 1 L) made of polyethylene containing 50 ml of distilled water, which was left in a constant-temperature chamber at a temperature of 60° C. for three hours, and then left at rest at room temperature for one hour. The amount of formaldehyde, which had been generated from the tabular test pieces and had been absorbed by distilled water in the bottle made of polyethylene, was quantitatively measured according to JIS K0102, 29 (section of formaldehyde), and the generation amount of formaldehyde per the unit weight of the test piece (μg/g) was calculated.

(Weathering (Light) Resistance)

After a tabular molded article (70 mm×40 mm×3 mm) was treated for 330 hours using Super Xenon Weather Meter XAL-2WL (Suga Test Instruments Co., Ltd) under a condition of the rising wavelength of 320 nm, the light intensity of sample surface of 162 w/m² (light intensity controlled from 300 to 400 nm), black panel temperature of 89° C. and no light/dark cycles, it was taken out and subjected to, along with the observation for the presence or absence of cracks on the surface with 50× light microscope, the measurement of change in hue (ΔE) and retention of glossiness (%) before and after the treatment by the method described below.

Change in Hue (ΔE)

The hue (L*, a*, b*) of a molded article was measured with a type Z-300A color sensor manufactured by NIPPON DENSHOKU, and the change in the hue was calculated using the following formula:

$$\Delta E = \{(L^*_1 - L^*_0)^2 + (a^*_1 - a^*_0)^2 + (b^*_1 - b^*_0)^2\}^{1/2}$$

where $L^*_0$, $a^*_0$ and $b^*_0$ represent the initial hue (L*, a*, b*), and $L^*_1$, $a^*_1$ and $b^*_1$ represent the hue (L*, a*, b*) after the irradiation.

A smaller value shows a smaller change in the hue.

Retention of Glossiness

The glossiness (measurement angle: 60 degrees) of the molded article was measured with a portable gloss meter HG-246 manufactured by SUGA TEST INSTRUMENTS to calculate the retention (%) using the following formula:

Retention (%) of glossiness=(initial glossiness)/(glossiness after the irradiation)×100

A larger value shows a smaller lowering of the gloss.

Examples 1 to 9

To 100 parts by weight of a polyacetal copolymer having a specified polymer quality indicator, a hindered phenol-based antioxidant, a guanamine compound, a hindered amine stabilizer, a UV absorber, a fatty acid ester consisting of fatty acid and polyalkylene glycol, polyalkylene glycol and other compounds were pre-blended at a ratio as shown in Table 1, which was then thrown into the main feed opening of a 30 mm diameter twin-screw extruder having one vent opening and molten and mixed (extrusion condition: L/D=35, extrusion temperature=200° C., screw rotation number=120 rpm, vent vacuum=−700 mmHg, discharge rate=18 kg/hr) to prepare a pellet-shaped composition. Further, a pellet-shaped composition was prepared by blending a desired part by weight of aluminum pigment relative to 100 parts by weight of this pellet-shaped composition and throwing again the blended product into the main feed opening of the 30 mm diameter twin-screw extruder having one vent opening and molten and mixed (extrusion condition: L/D=35, extrusion temperature=200° C., screw rotation number=120 rpm, vent vacuum=−700 mmHg, discharge rate=18 kg/hr).

By using this composition, predetermined tabular test pieces were molded with an injection-molding machine having a cylinder temperature set at 190° C. to perform the evaluation of the generation of formaldehyde from the molded article, weathering (light) resistance, and bleeding properties. Results are shown in Table 1.

Comparative Examples 1 to 5

For comparison and as shown in Table 2, evaluations were conducted in the same manner as Examples described above when using hindered amine-based stabilizer, containing neither amine stabilizer nor ultraviolet absorber, and using a polymer in which the polymer quality indicator is not within the definition of the present invention. The evaluation results are shown in Table 2.

Polyacetal copolymers, hindered phenol-based antioxidants, guanamine compounds, hindered amine stabilizers, UV absorbers, metallic pigments, fatty acid esters, and other compounds used in Examples and Comparative Examples are as follows.

A. Polyacetal Copolymer (a-1): polyacetal copolymer (a polyacetal copolymer in which the amount of a hemiformal terminal group containing 0.03% by weight of ethylene-bis(oxyethylene)bis[3-(3-(5-t-butyl-4-hydroxy-m-tolyl)propionate)=0.38 mmol/kg, the amount of a formyl terminal group=0.03 mmol/kg, the amount of an unstable terminal group=0.15% by weight, the melt index=9 g/10 min)

Using a twin screw paddle type continuous polymerization machine, trioxane, to which 2.5% (in the whole monomer) of 1,3-dioxolan having been incorporated with 0.03% by weight of ethylene-bis(oxyethylene)bis[3-(3-(5-t-butyl-4-hydroxy-m-tolyl)propionate relative to the total monomer (trioxane+1,3-dioxolan) was added, was continuously fed, and polymerization was performed using boron trifluoride as a catalyst (catalyst concentration: $2 \times 10^{-3}$ mol %) fed to the same portion at the same time. Meanwhile, the concentration of impurities in the monomer used at that time were $3 \times 10^{-3}$ mol % for water, $1 \times 10^{-3}$ mol % for methanol and $1 \times 10^{-3}$ mol % for formic acid.

To the polymer discharged from the discharge opening of the polymerization machine, an aqueous solution containing 1000 ppm of triethylamine was added just after the discharge, which was then subjected to mixing and pulverization and stirring at the same time. Subsequently, centrifugation and drying were performed to obtain a polymer in which the catalyst had been deactivated.

The polymer was fed to the twin screw extruder having a vent opening to be molten and kneaded at a resin temperature of about 220° C. to remove unstable terminals while reduced-pressure degassing was performed at the vent opening, to thereby obtain a pellet-shaped polymer.

Next, by using a heat-insulating cylindrical pressure tight vessel, while the pellet-shaped polymer being continuously fed from the upper portion of the vessel and a 500 ppm % triethylamine aqueous solution being fed at 135° C. from the lower portion, treatment was performed for 8 hours. Then, centrifugation and drying were performed to give an intended polymer.

(a-2): polyacetal copolymer (a polyacetal copolymer in which the amount of a hemiformal terminal group containing 0.04% by weight of pentaerythritol tetrakis[3-(3,5-di-t-butyl-4-hydroxyphenyl)propionate]=1.20 mmol/kg, the amount of a formyl terminal group=2.26 mmol/kg, the amount of an unstable terminal group=0.6% by weight, the melt index=9 g/10 min)

By using a twin-screw paddle type continuous polymerization machine, trioxane, to which 2.5% (in the whole monomer) of 1,3-dioxolan having been incorporated with 0.04% by weight of pentaerythritol tetrakis[3-(3,5-di-t-butyl-4-hydroxyphenyl)propionate] relative to the total monomer (trioxane+1,3-dioxolan) was added, was continuously fed, and polymerization was performed using boron trifluoride as a catalyst (catalyst concentration: $2 \times 10^{-3}$ mol %) fed to the same portion at the same time.

To the polymer discharged from the discharge opening of the polymerization machine, an aqueous solution containing 1000 ppm of triethylamine was added just after the discharge, which was then subjected to mixing and pulverization and, at the same time, stirring treatment. Subsequently, centrifugation and drying were performed to thereby obtain a polymer in which the catalyst had been deactivated.

The polymer was fed to the twin-screw extruder having a vent opening to be molten and kneaded at a resin temperature of about 220° C. to remove unstable terminals while reduced-pressure degassing was performed at the vent opening, to thereby obtain a pellet-shaped polymer. Then, centrifugation and drying were performed to thereby obtain an intended polymer.

Meanwhile, the amounts of the hemiformal terminal group and formyl terminal group of the polyacetal copolymer are the values (mmol/kg) obtained by performing the measurement according the method described in JP-A 2001-11143 with a type AVANCE400 FT-NMR apparatus manufactured by Bruker.

Furthermore, the amount of unstable terminal group was obtained as follows. 1 g of the polyacetal copolymer was put in a pressure tight vessel with 100 ml of a 50% (volume %) methanol aqueous solution containing 0.5% (volume %) of an ammonium hydroxide and heat-treated for 45 minutes at 180° C., which was then cooled and opened. Subsequently, the amount of formaldehyde decomposed and dissolved in the obtained solution was measured quantitatively and the value was represented in % by weight relative to the polyacetal copolymer.

In addition, the above-described melt index is a value (g/10 min) obtained under the condition of 190° C. and 2160 g according to ASTM-D1238.

B. Hindered Phenol-Based Antioxidant (b-1): ethylene-bis(oxyethylene)bis-[3-(3-(5-t-butyl-4-hydroxy-m-tolyl)propionate) (IRGANOX 245)

(b-2): pentaerythritol tetrakis[3-(3,5-di-t-butyl-4-hydroxyphenyl)propionate] (IRGANOX1010)

C. Guanamine Compound (c-1): benzoguanamine (c-2): melamine

D. Hindered Amine Stabilizer

The hindered amine stabilizer in which the nitrogen in the piperidine derivative having a steric hindrance group is ternary (d-1): condensation product of 1,2,3,4-butane tetracarboxylic acid, 1,2,2,6,6,-pentamethyl-4-piperidinol and β,β,β',β'-tetramethyl-3,9-(2,4,8,10-tetraoxaspiro[5,5]-undecane)-diethanol (ADEKASTAB LA-63P)

The hindered amine stabilizer in which the nitrogen in a piperidine derivative having a steric hindrance group is secondary (d-2): bis(2,2,6,6-tetramethyl-4-piperidyl)sebacate (TINUVIN 770DF)

E. UV Absorber (e-1): 2-(2H-benzotriazole-2-yl)-4,6-bis(1-methyl-1-phenylethyl)phenol (TINUVIN 234)

F. Metallic Pigment (f-1): Aluminum powder dispersed in polyethylene (aluminum 70 wt %/polyethylene 30 wt %)

G. Fatty Acid Ester Made Up of Fatty Acid and Polyalkylene Glycol (g-1): polyethylene glycol monostearic acid ester (average polymerization degree of polyethylene glycol: 90) (nonion S-40)

H. Others (h-1): calcium 12-hydroxystearate (h-2): ethylene bisstearylamide

TABLE 1

| | | Examples | | | | | | | | |
|---|---|---|---|---|---|---|---|---|---|---|
| | | 1 | 2 | 5 | 3 | 4 | 6 | 7 | 8 | 9 |
| (A) Polyacetal copolymer | Kinds | a-1 | a-1 | a-1 | a-1 | a-1 | a-1 | a-1 | a-1 | a-1 |
| | Parts by weight | 100 | 100 | 100 | 100 | 100 | 100 | 100 | 100 | 100 |
| (B) Hindered phenol-based antioxidant | Kinds | b-2 | b-2 | b-2 | b-2 | b-2 | b-2 | b-2 | b-2 | b-1 |
| | Parts by weight | 0.1 | 0.1 | 0.1 | 0.1 | 0.1 | 0.1 | 0.1 | 0.1 | 0.1 |
| (C) Guanamine compound | Kinds | c-1 | c-1 | c-1 | c-1 | c-1 | c-1 | c-1 | c-2 | c-1 |
| | Parts by weight | 0.5 | 0.5 | 0.5 | 0.5 | 0.5 | 0.5 | 0.5 | 0.1 | 0.5 |
| (D) Hindered amine stabilizer | Kinds | d-1 | d-1 | d-2 | d-1 | d-1 | d-1 | d-1 | d-1 | d-1 |
| | Parts by weight | 0.5 | 0.5 | 0.5 | 0.5 | 0.5 | 0.5 | 0.5 | 0.5 | 0.5 |
| (E) UV absorber | Kinds | e-1 | e-1 | e-1 | e-1 | e-1 | e-1 | e-1 | e-1 | e-1 |
| | Parts by weight | 0.5 | 0.5 | 0.5 | 0.5 | 0.5 | 0.5 | 0.5 | 0.5 | 0.5 |
| (F) Metallic pigment | Kinds | f-1 | f-1 | f-1 | f-1 | f-1 | f-1 | f-1 | f-1 | f-1 |
| | Parts by weight | 5 | 12 | 5 | 5 | 12 | 5 | 12 | 5 | 5 |
| (G) Fatty acid ester | Kinds | | | | g-1 | g-1 | g-1 | g-1 | g-1 | g-1 |
| | Parts by weight | | | | 0.5 | 0.5 | 0.5 | 0.5 | 0.5 | 0.5 |
| (H) Others | Kinds | | | | | | h-1/h-2 | h-1/h-2 | h-1/h-2 | h-1/h-2 |
| | Parts by weight | | | | | | 0.1/0.2 | 0.1/0.2 | 0.1/0.2 | 0.1/0.2 |
| Generation amount of formaldehyde (μg/g) | | 2.7 | 2.9 | 3.5 | 2.0 | 2.2 | 1.5 | 1.7 | 2.8 | 2.0 |
| Presence or absence of cracks | | Faintly observed | Faintly observed | Faintly observed | Nonexistence | Nonexistence | Nonexistence | Nonexistence | Nonexistence | Nonexistence |
| ΔE* | | 0.5 | 0.7 | 0.5 | 0.5 | 0.6 | 0.6 | 0,7 | 0.4 | 0.6 |
| Retention of glossiness (%) | | 100 | 100 | 100 | 100 | 100 | 100 | 100 | 100 | 100 |

TABLE 2

| | | Comparative example 1 | Comparative example 2 | Comparative example 3 | Comparative example 4 | Comparative example 5 |
|---|---|---|---|---|---|---|
| (A) Polyacetal copolymer | Kinds | a-1 | a-1 | a-2 | a-1 | a-2 |
| | Parts by weight | 100 | 100 | 100 | 100 | 100 |
| (B) Hindered phenol-based antioxidant | Kinds | b-2 | b-2 | b-2 | b-2 | b-2 |
| | Parts by weight | 0.1 | 0.1 | 0.1 | 0.1 | 0.1 |
| (C) Guanamine compound | Kinds | | c-1 | c-1 | c-1 | c-1 |
| | Parts by weight | | 0.5 | 0.5 | 0.5 | 0.5 |
| (D) Hindered amine stabilizer | Kinds | d-1 | | d-1 | | d-1 |
| | Parts by weight | 0.5 | | 0.5 | | 0.5 |
| (E) Ultraviolet absorber | Kinds | e-1 | | e-1 | | e-1 |
| | Parts by weight | 0.5 | | 0.5 | | 0.5 |
| (F) Metallic pigment | Kinds | f-1 | f-1 | f-1 | f-1 | f-1 |
| | Parts by weight | 5 | 5 | 5 | 5 | 5 |
| (G) Fatty acid ester | Kinds | | | | g-1 | g-1 |
| | Parts by weight | | | | 0.5 | 0.5 |
| (H) Others | Kinds | | | | h-1/h-2 | h-1/h-2 |
| | Parts by weight | | | | 0.1/0.2 | 0.1/0.2 |
| Generation amount of formaldehyde (μg/g) | | 5.3 | 1.7 | 6.0 | 1.0 | 5.1 |
| Presence or absence of cracks | | Nonexistence | Observed overall | Faintly observed | Observed overall | Nonexistence |
| ΔE* | | 0.3 | 2.0 | 0.6 | 2.1 | 0.5 |
| Retention of glossiness (%) | | 100 | 62 | 100 | 60 | 100 |

As is clear from Tables 1 to 2, when polyacetal compositions of Examples are used, the molded article generates an extremely small amount of formaldehyde, and also has excellent weathering (light) resistance, when compared with Comparative Examples. Consequently, the polyacetal composition of the present invention can favorably be used for various molded articles requiring low VOC properties and high weathering (light) resistance, for example, molded articles for building materials and car interior furnishing.

The invention claimed is:
1. A polyacetal resin composition, comprising:
(A) 100 parts by weight of a polyacetal copolymer containing 1.0 mmol/kg or smaller or a hemiformal terminal group, 2.0 mmol/kg or smaller of a formyl terminal group, 0.5 wt % or smaller of an unstable terminal group,
(B) 0.03 to 0.30 part by weight of a hindered phenol-based antioxidant,
(C) 0.01 to 1 part by weight of a guanamine compound,
(D) 0.2 to 1 part by weight of a hindered amine-based stabilizer,
(E) 0.1 to 1 part by weight of a UV absorber, and
(F) 3 to 10 parts by weight of a metallic pigment,
wherein the composition exhibits a reduced formaldehyde emission of 3.5 μg/g and below, and improved weatherability after exposure to light of 330 hours at a wavelength of 320 nm and an intensity of 162 w/m$^2$ of 100% gloss retention and a change in hue (ΔE) of 0.7 or less.

2. The polyacetal resin composition according to claim 1, wherein the hindered amine-based stabilizer (D) is a piperidine derivative having a sterically-hindered group, and the nitrogen forming the cyclic amine thereof is tertiary nitrogen.

3. The polyacetal resin composition according to claim 1, wherein the hindered amine-based stabilizer (D) is selected from the group consisting of tetrakis (1,2,2,6,6-pentamethyl-4-piperidyl)1,2,3,4-butane tetracarboxylate; a condensate of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)-diethanol; and a polymer of dimethyl succinate and 4-hydroxy-2,2,6,6-tetramethyl-1-piperidine ethanol.

4. The polyacetal resin composition according to claim 1, wherein the UV absorber (E) is selected from the group consisting of 2-(2H-benzotriazole-2-yl)-4,6-bis(1-methyl-1-phenylethyl)phenol and N-(2-ethylphenyl)-N'-(2-ethoxyphenyl)diamide oxalate.

5. The polyacetal resin composition according to claim 1, wherein the metallic pigment (F) is aluminum powder.

6. The polyacetal resin composition according to claim 1, further comprising (G) 0.01 to 5.0 parts by weight of a compound selected from the group consisting of a fatty acid ester and a polyalkylene glycol relative to 100 parts by weight of the polyacetal copolymer (A).

7. The polyacetal resin composition according to claim 1, wherein the metallic pigment (F) is dispersed in polyethylene.

8. The polyacetal resin composition according to claim 5, wherein the metallic pigment (F) is dispersed in polyethylene.

9. A polyacetal resin composition, comprising:
(A) 100 parts by weight of a polyacetal copolymer containing 1.0 mmol/kg or smaller or a hemiformal terminal group, 2.0 mmol/kg or smaller of a formyl terminal group, 0.5 wt % or smaller of an unstable terminal group,
(B) 0.03 to 0.30 part by weight of a hindered phenol-based antioxidant,
(C) 0.01 to 1 part by weight of a guanamine compound,
(D) 0.2 to 1 part by weight of a hindered amine-based stabilizer,
(E) 0.1 to 1 part by weight of a UV absorber, and
(F) 3 to 10 parts by weight of a metallic pigment, wherein the metallic pigment is dispersed in a polyethylene,
wherein the composition exhibits a reduced formaldehyde emission of 3.5 μg/g and below, and improved weatherability after exposure to light of 330 hours at a wavelength of 320 nm and an intensity of 162 w/m$^2$ of 100% gloss retention and a change in hue (ΔE) of 0.7 or less.

10. The polyacetal resin composition according to claim 9, wherein the metallic pigment (F) is aluminum powder.

11. The polyacetal resin composition according to claim 9, wherein the hindered amine-based stabilizer (D) is a piperidine derivative having a sterically-hindered group, and the nitrogen forming the cyclic amine thereof is tertiary nitrogen.

12. The polyacetal resin composition according to claim 9, wherein the hindered amine-based stabilizer (D) is selected from the group consisting of tetrakis (1,2,2,6,6-pentamethyl-4-piperidyl)1,2,3,4-butane tetracarboxylate; a condensate of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)-diethanol; and a polymer of dimethyl succinate and 4-hydroxy-2,2,6,6-tetramethyl-1-piperidine ethanol.

13. The polyacetal resin composition according to claim 9, wherein the UV absorber (E) is selected from the group consisting of 2-(2H-benzotriazole-2-yl)-4,6-bis(1-methyl-1-phenylethyl)phenol and N-(2-ethylphenyl)-N'-(2-ethoxyphenyl)diamide oxalate.

14. The polyacetal resin composition according to claim 9, further comprising (G) 0.01 to 5.0 parts by weight of a compound selected from the group consisting of a fatty acid ester and a polyalkylene glycol relative to 100 parts by weight of the polyacetal copolymer (A).

* * * * *